(12) United States Patent
Abernethy et al.

(10) Patent No.: US 7,779,402 B2
(45) Date of Patent: Aug. 17, 2010

(54) SYSTEM AND METHOD FOR FINE GRAIN METHOD UPDATE OF AN APPLICATION TO PROVIDE CONTINUOUS AVAILABILITY

(75) Inventors: Michael Negley Abernethy, Pflugerville, TX (US); Travis M. Grigsby, Austin, TX (US); Syed-Muasir Khalil, Austin, TX (US); Truong-An Hoan Thai, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 11/466,224

(22) Filed: Aug. 22, 2006

(65) Prior Publication Data

US 2008/0052701 A1   Feb. 28, 2008

(51) Int. Cl.
G06F 9/44 (2006.01)
G06F 9/45 (2006.01)

(52) U.S. Cl. .................... 717/168; 717/170; 709/203

(58) Field of Classification Search ......... 717/167–174; 709/203–204
See application file for complete search history.

(56) References Cited

U.S. PATENT DOCUMENTS

| | | | | |
|---|---|---|---|---|
| 6,026,430 A * | 2/2000 | Butman et al. | ............... | 709/203 |
| 6,138,274 A | 10/2000 | Huang et al. | | |
| 6,408,434 B1 * | 6/2002 | Fujiwara | ...................... | 717/170 |
| 6,606,744 B1 * | 8/2003 | Mikurak | ....................... | 717/174 |
| 6,694,513 B1 * | 2/2004 | Andersson et al. | ........... | 717/165 |
| 7,047,528 B2 * | 5/2006 | Iida | ............................ | 717/170 |
| 7,191,435 B2 * | 3/2007 | Lau et al. | ...................... | 717/168 |
| 7,192,435 B2 * | 3/2007 | Corcoran et al. | ............. | 606/213 |
| 7,206,805 B1 * | 4/2007 | McLaughlin, Jr. | ........... | 709/203 |
| 7,246,351 B2 * | 7/2007 | Bloch et al. | ................. | 717/175 |
| 7,263,698 B2 * | 8/2007 | Wildhagen et al. | .......... | 717/170 |
| 7,392,505 B2 * | 6/2008 | Ciapala et al. | ............... | 717/106 |
| 7,480,699 B2 * | 1/2009 | Alam et al. | .................. | 709/217 |
| 7,516,206 B2 * | 4/2009 | Henseler et al. | ............. | 709/223 |
| 7,546,595 B1 * | 6/2009 | Wickham et al. | ............ | 717/168 |
| 7,600,224 B2 * | 10/2009 | Obayashi et al. | ............. | 717/168 |
| 2004/0010786 A1 | 1/2004 | Cool et al. | | |
| 2005/0234987 A1 | 10/2005 | Cyphers | | |
| 2005/0268297 A1 | 12/2005 | Kovachka-Dimitrova et al. | | |

(Continued)

OTHER PUBLICATIONS

Edwards et al, "Self-Software Architectures and Component Middleware in Pervasive Environments"ACMMPAC, pp. 25-30, 2007.*

(Continued)

*Primary Examiner*—Anil Khatri
(74) *Attorney, Agent, or Firm*—VanLeeuwen & VanLeeuwen; Justin M. Dillon

(57) ABSTRACT

A system, method, and program product for updating a software program running in a middleware environment, such as a Java™ environment, are provided. An update request is received for a method loaded in the middleware environment. The request identifies a new version of the method and the method's class file. The new version is registered. Registering of the new version includes writing the new version to a heap managed by the middleware environment. In this manner, both the old version and the new version of the method can be executed. The update of the class file is scheduled for a future time. Subsequent requests are either routed to the old version of the method or re-routed to the new version. At the scheduled time, the class file is updated by replacing the old method with the new version.

6 Claims, 8 Drawing Sheets

U.S. PATENT DOCUMENTS

2005/0278278 A1 12/2005 Petev et al.
2006/0020689 A1 1/2006 Roman et al.
2006/0020938 A1 1/2006 Elcock et al.

OTHER PUBLICATIONS

Dumitras, "Dependable, Online Upgrades in Enterprise Systems" ACM OOPSLA, pp. 835-836, 2009.*

Bellebia et al, "Applying Patterns to Build a Lightweight Middleware for Embedded Systems", ACM PLoP, pp. 1-13, 2006.*

Pelc et al, "Practical Implementation of a Middleware and Software Component Architecture supporting Reconfigurability of Real-Time Embedded Systems", IEEE, pp. 394-401, 2009.*

* cited by examiner

SYSTEM AND METHOD FOR FINE GRAIN METHOD UPDATE OF AN APPLICATION TO PROVIDE CONTINUOUS AVAILABILITY

BACKGROUND OF THE INVENTION

1. Technical Field

The present invention relates to a system and method for updating a software application. More particularly, the present invention relates to a system and method for updating methods of an application that is running within a middleware software environment.

2. Description of the Related Art

In a middleware environment, such as a Java™ environment, platform-neutral applications can be deployed with the middleware environment handling platform dependent issues. Various middleware environments are provided for different computer platforms. These platforms are served by different virtual machines. For example, in a Java™ middleware environment, different Java Virtual Machines (JVMs) are executed on a different computer platforms, such as a computer running a Microsoft Windows™ operating system, a computer running IBM's AIX™ operating system, and a computer running an Apple Macintosh™ operating system.

Because of the versatility in using a middleware environment, middleware applications that execute in the middleware environment, such as Java™ software applications, are increasingly popular and are becoming increasingly complex. Middleware applications often serve a number of users, or "clients," over a computer network, such as the Internet. Application servers have been developed to serve these middleware applications to clients. One example of a middleware application server is a J2EE™ application server that serves Java™ software applications to clients. These application servers facilitate deployment and management of the middleware applications that they serve.

After a middleware application has been deployed and subsequently started by the middleware application server, it can serve clients often for an extended period of time. However, it is unlikely that an initial version of a middleware application will adequately serve client demands throughout the lifetime of the middleware application. Instead, most middleware applications require periodic updates for a variety of reasons. First, minor bug fixes typically involve problems reported by production users or from ongoing application testing. Minor bug fixes often result in minor modifications to application logic and typically involve updates to a small number of application files and do not usually change application behavior or interfaces. Frequency of such minor bug fix updates can vary from a few per day to a set of cumulative fixes applied periodically. Second, minor content modifications are similar in scope to minor bug fixes and are often treated as small feature enhancements resulting from user feedback or new requirements for the business logic. Such minor content modifications updates could include changes to a company logo, copyright statements, or even updates to application pages that provide feedback. Third, deployment of a new revision is generally a major update to the application logic, possibly including code additions or deletions, or other significant modifications to business logic. Such updates are usually not performed frequently, and are usually performed so only after extensive application and load testing have been completed. Deployment of a new revision is typically scheduled to be applied during off-peak hours (e.g., nights or weekends).

Traditionally, middleware application servers only support Full Application Updates, which requires a application code (e.g., J2EE enterprise application archive (EAR) files in a Java™ implementation) that is expected to replace the deployed application code file. The update process simply uninstalls the deployed middleware application file and installs the new one. When the updated middleware application file is synchronized with the target nodes, the application is stopped (if it was running on the application servers on that node), then replaced and subsequently restarted.

Having to perform Full Application Updates presents a number of challenges. First, since the update support only accepts a complete middleware application file (e.g., an EAR file), the entire middleware application file is packaged even for a simple change. Second, if an application is updated while it is running, the entire application is recycled (i.e., stopped and restarted) on the target nodes when the application files are replaced. Third, since the application update performs application uninstall followed by an install, any application configuration performed post deployment (such as the configuration of shared libraries) is lost during the update.

SUMMARY

It has been discovered that the aforementioned challenges are resolved using a system, method and computer program product that updates methods of an application running in a middleware environment. One example of a middleware environment is the Java™ environment provided by a Java Virtual Machine (JVM). A deployment manager is used to receive an update request for a method running in the middleware environment. The update request identifies a new version of the method as well as a class file that includes the method that is being updated. The new version of the method is registered by the deployment manager. Registering of the new version of the method includes writing the executable code of the new version to a memory heap that is managed by the middleware environment. In this manner, both the old version and the new version of the method can be executed. The deployment manager schedules the update of the class file for a future time. After the method is registered but before the class file is updated, requests for the method are received by the deployment manager. These requests are either routed to the old version of the method or re-routed to the new version of the method. At the scheduled time, the class file is updated by replacing the old method with the new version of the method.

In one embodiment, the future time when the class file is updated is determined by gathering usage data corresponding to the method. The gathered usage data is analyzed to determine a preferred time to update the class file, such as a time when the method is infrequently called. The preferred time is then used as the future time to update the method.

In one embodiment, after the new version has been registered but before the class file has been updated, new requests are received for the method. The deployment manager determines which of the new requests to route to the old method and which of the new requests to re-route to the new version of the method. In one embodiment, the deployment manager uses a routing policy and the current connection existing between the method and the requestor that sent the request. For example, one policy re-routes new requests to the new version of the application and route requests to the old version of the method for those requesters (e.g., clients) already connected to the application. Another policy makes the new version of the method available to all requesters with new requests being routed to the old method only for those requesters that are currently using the old method.

In one embodiment, requests for the application that are received after updating of the class file has commenced are queued in a request queue. After the class file has been updated (replacing the old method with the new version of the method), the queued requests are processed. Requests for the method are now executed by the new version of the method (the new version having replaced the old version in the class file).

In one embodiment, multiple method replacement requests are received for the same class file. In this embodiment, usage data for the various methods that are being updated are analyzed to identify a preferred time to update the class file. After each new version of a method is received (but before the class file is updated), the deployment manager determines whether to send new requests for the method to the old version of the method or to the new version of the method. At the preferred time, the class file is updated by replacing the various methods with new versions of the methods. While the class file is being updated, all requests for methods within the class file are queued and processed after the class file has been updated.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
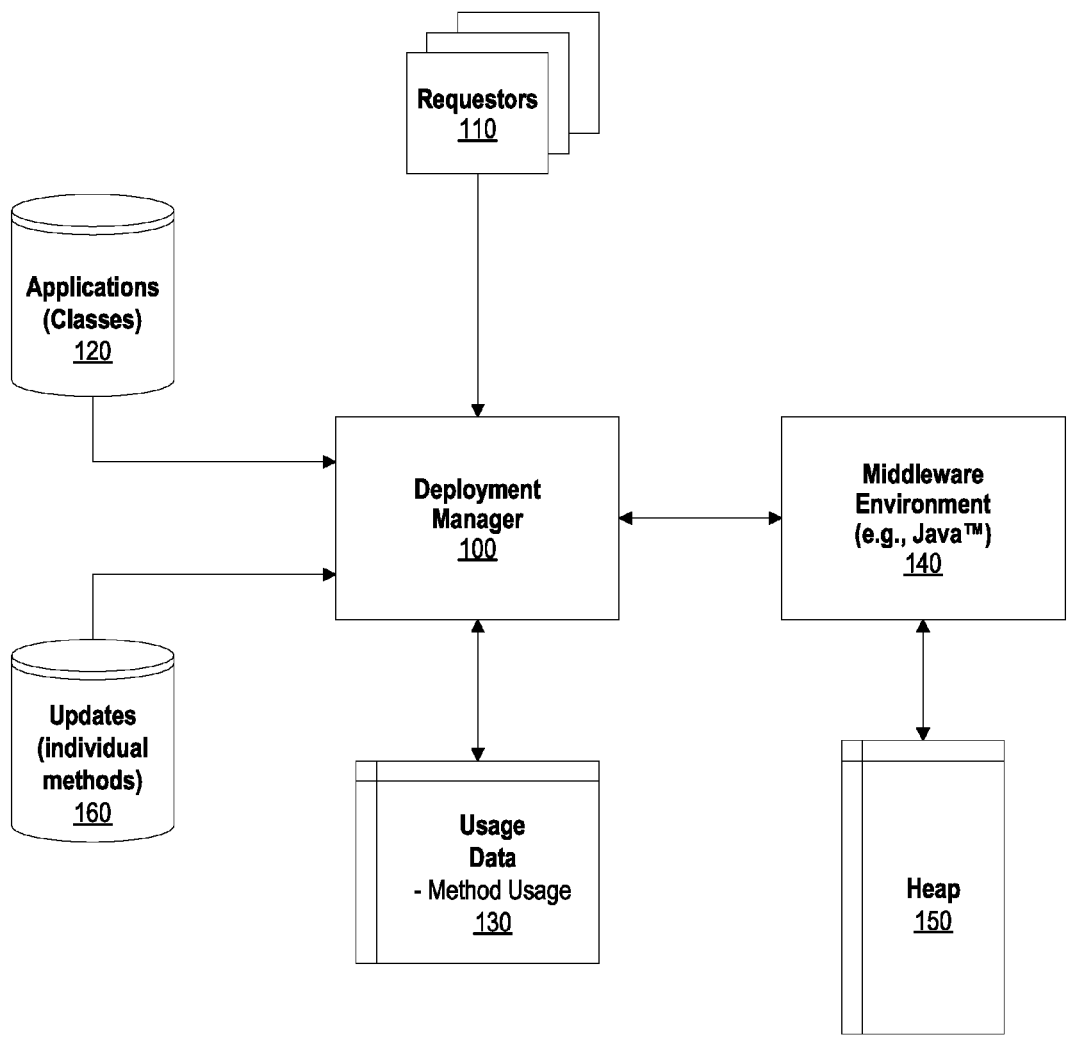
FIG. 1 is a component-level diagram showing an embodiment of the various entities, processes, and data stores used in updating methods of an application.

FIG. 1 is a component-level diagram showing the various entities, processes, and data stores used in updating methods of an application. As the name implies, Deployment Manager 100 deploys applications 120 as well as individual method updates 160 to middleware environment 140. One example of a middleware environment is a Java™ application environment where a Java Virtual Machine (JVM) is used to manage applications using heap 150.

Requestors 110 include users requesting applications using a user interface as well as other methods. When an application is to be updated, an update request is prepared. Update requests include both the new version of the method as well as an update description that identifies the application being updated, package being updated, the class file being updated, and the method that is being updated. While applications are running, the deployment manager gathers usage data 130. Usage data 130 is then used by the deployment manager to schedule when a class file is updated with one or more methods (160) that were received. As will be more fully explained below, when a class file is being updated, requests received from requestors 110 for methods of the class are queued until the class file has been updated. During the update process, the deployment manager replaces the current (old) version of the methods scheduled for update with new versions of the methods (160). After the class file has been updated, the deployment manager processes the queued requests. The queued requests are executed using the updated class file with the new versions of the methods.

Figure 2:
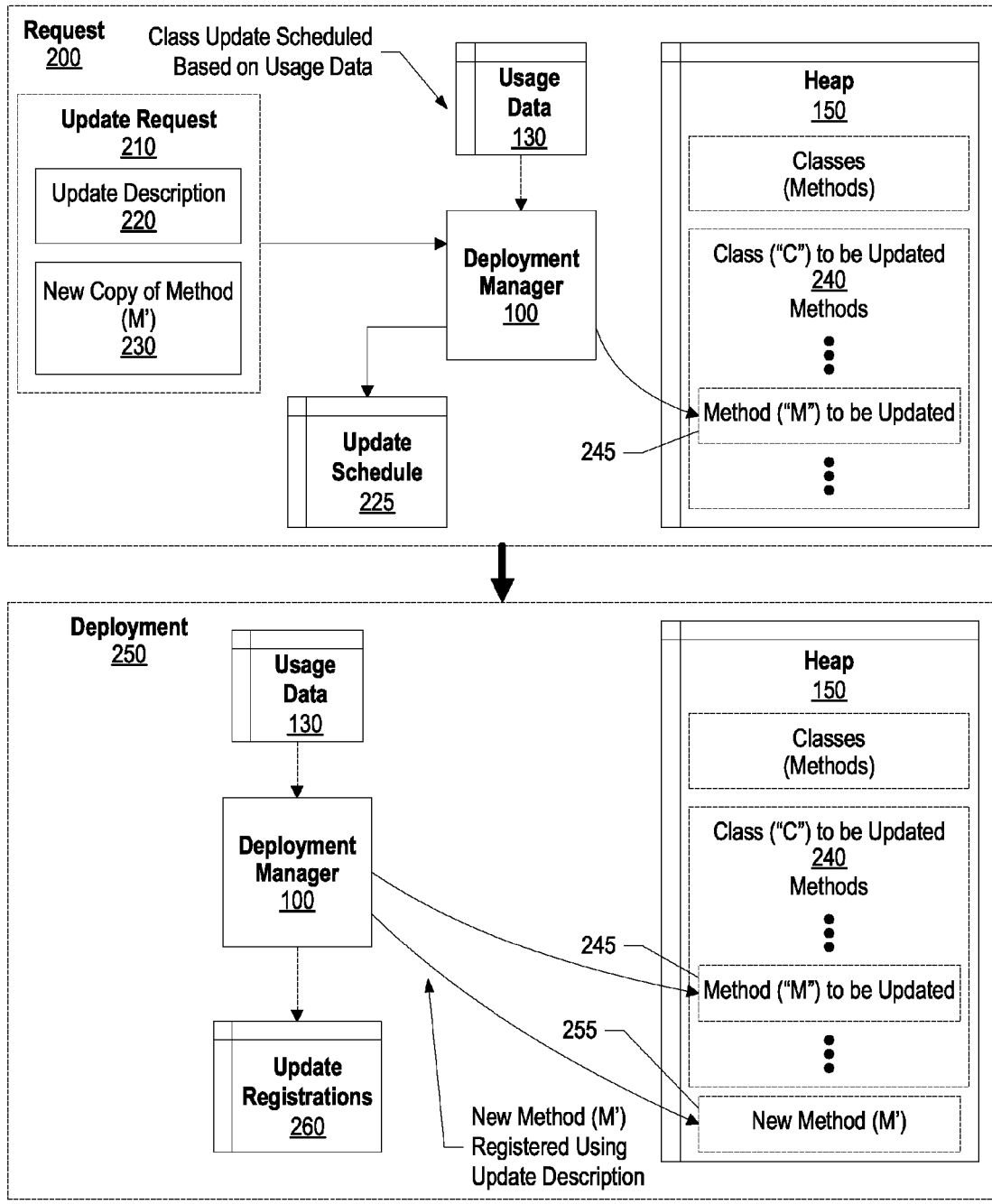
FIG. 2 is a high-level diagram showing an embodiment of activities performed during the request and deployment phases in updating a middleware application.

FIG. 2 is a high-level diagram showing activities performed during the request and deployment phases in updating a middleware application. Request phase 200 commences when deployment manager 100 receives update request 210. As shown, update request 210 includes both update description 220 and new version of the method 230. Deployment manager 100 analyzes usage data 130 in order to schedule the update of the class file. In particular, the request identifies method 245 within the class file 240 that is updated with the new version of the method 230. The scheduled update time is added to update schedule 225.

The middleware environment, such as a Java™ environment, maintains heap 150. Heap 150 includes classes corresponding to applications currently running in the middleware environment. Update request 210 pertains to method 245 within class 240. Class 240 and method 245 are both stored in heap 150 that is being managed by the middleware environment.

After request phase 200, deployment phase 250 commences. During deployment phase 250, deployment manager 100 registers the new version of the method by writing meta data to update registrations memory area 260. Update registrations memory area 260 are stored in a volatile memory, such as a Random Access Memory (RAM) or in a nonvolatile memory area, such as a disk file. Deployment manager 100 registers the new version of the method (255) with the middleware application. The registration of the new version results in new version of the method 255 being stored in heap 150 along with old method of the method 245.

Figure 3:
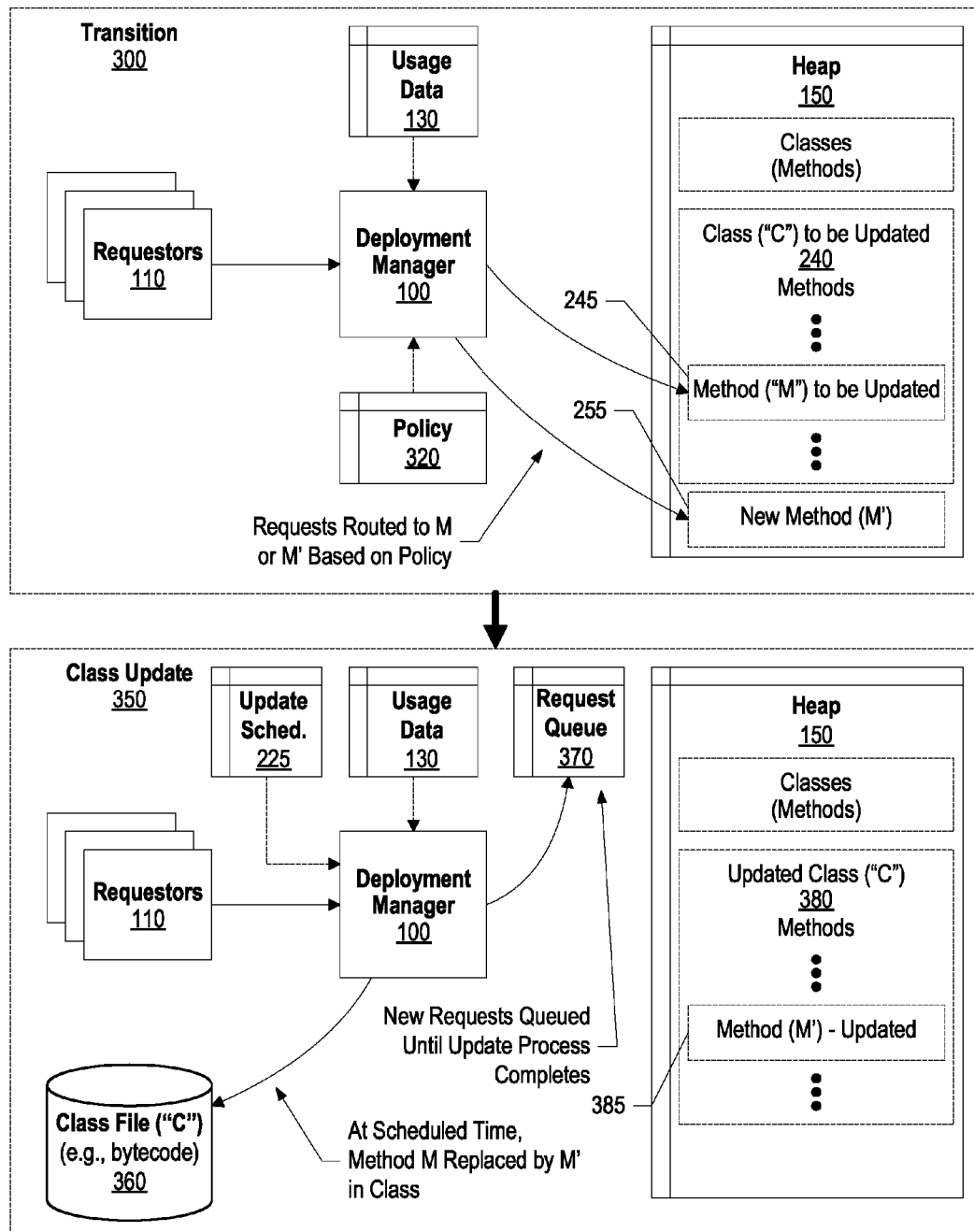
FIG. 3 is a high-level diagram showing an embodiment of activities performed during the transition and class update phases in updating a middleware application.

FIG. 3 is a high-level diagram showing activities performed during the transition and class update phases in updating a middleware application. After the request and deployment phases, transition phase 300 commences. As the name implies, during the transition phase, requests are transitioned from the old version of the method (245) to new version (255). In one embodiment, the transition is based upon policy 320. When requestors 110 request the method that is being updated, policy 320 is used to determine whether the old version of the method (245) is executed or if the new version of the method (255) is executed. The policy works in conjunction with a current connection of the requester. For example, one policy routes new requests for new requestors (i.e., new connections) to the new version of the method (255), while routing old requestors (e.g., those requestors with current connections) to the old version of the method (245). Another policy routes requests to the new version of the method (255) for all requestors (i.e., both new connections for new requestors as well as old requestors already having connections), and use the old version of the method (245) only for those requestors currently executing the method.

At the scheduled time, class update phase 350 is performed. Deployment manager 100 checks update schedule 225 to ascertain when to update the class. At the scheduled time, deployment manager 100 temporarily takes the class offline. When the class is taken offline, requests received from requestors 110 are stored in request queue 370. The update of the class file is stored in class file 360. During the update of the class file, the deployment manager replaces the old version of the method (245) with the new version of the method (255). Class file 360 includes all the methods of the class. After the update, class file 360 includes new version of the method (255) and no longer includes old version of the method (245). When the class is re-invoked, the middleware application loads class file 360 into heap 150. In a Java™ environment, the class file may include bytecode which is a platform-independent representation of the class. When the class file is reloaded, the JVM recompiles the bytecode for the platform. This results in updated class 380 being stored in heap 150. As shown, updated class 380 now includes the new version of the method (385). Requests for the method are now executed by updated method 385. After the class file has been updated, the deployment manager processes the requests queued in request queue 370. The queued requests are executed using updated class 380 (including updated method 385).

Figure 4:
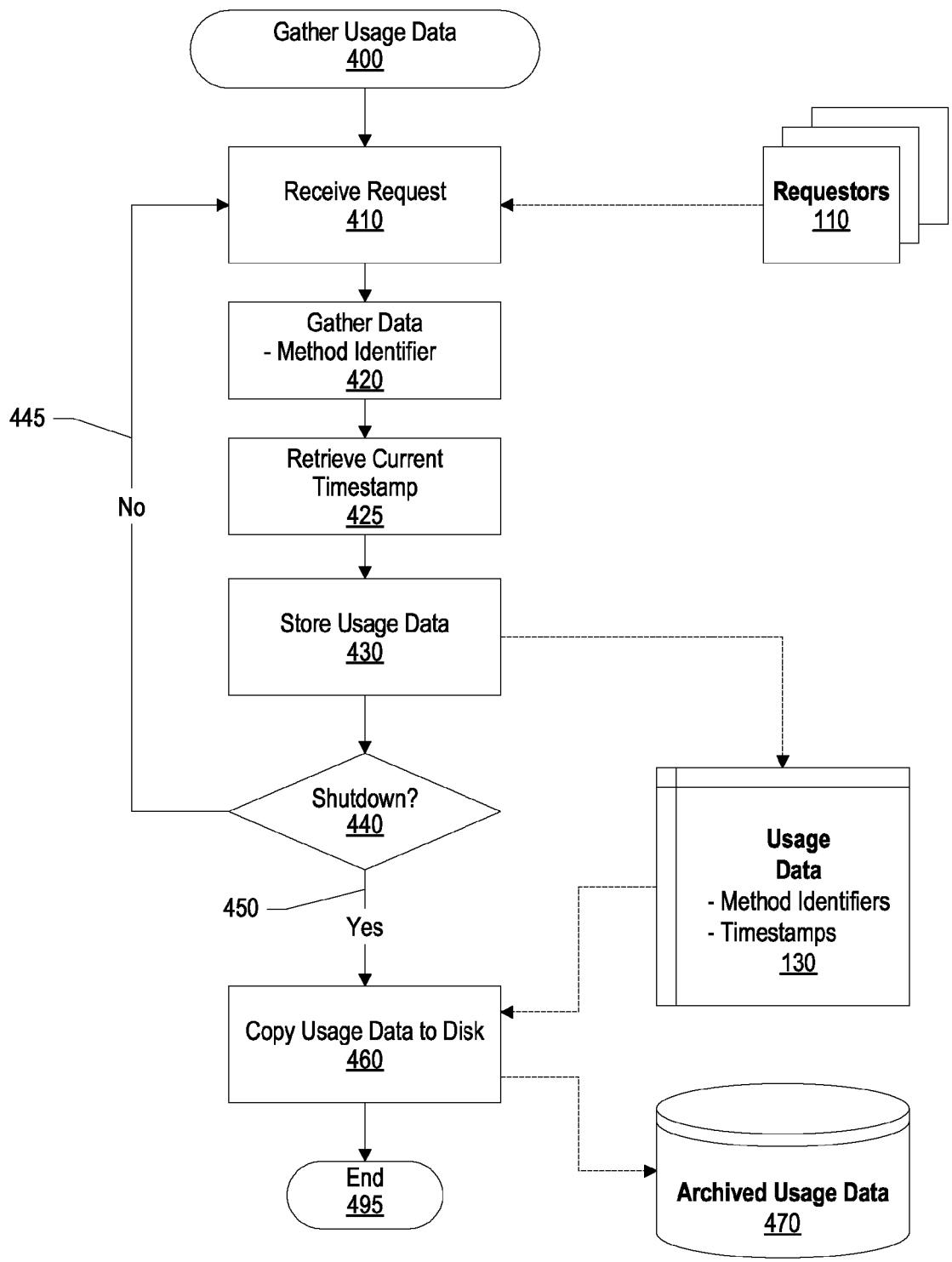
FIG. 4 is a flowchart showing an embodiment of steps taken to gather usage data.

FIG. 4 is a flowchart showing steps taken to gather usage data. Processing commences at 400 whereupon, at step 410, a request is received from requestors 110. Data corresponding to the request is gathered at step 420. This data includes the identifier of the method being requested. In addition, the identifiers for the application, package, and class can also be gathered. At step 425, the current timestamp is retrieved, and at step 430, the usage data is stored along with the current timestamp in usage data store 130.

A determination is made as to whether to continue or shutdown (decision 440). If processing continues, decision 440 branches to "no" branch 445 whereupon processing loops back to receive the next request and gather/store usage data. This looping continues until a shutdown request is received. The shutdown request shuts down the middleware environment or the computer system. When a shutdown request is received, decision 440 branches to "yes" branch 450 whereupon, at step 460, the usage data stored in memory 130 is copied to archived data store 470. The archived data store is stored in nonvolatile memory, such as a disk file. Usage data gathering thereafter ends at 495.

Figure 5:
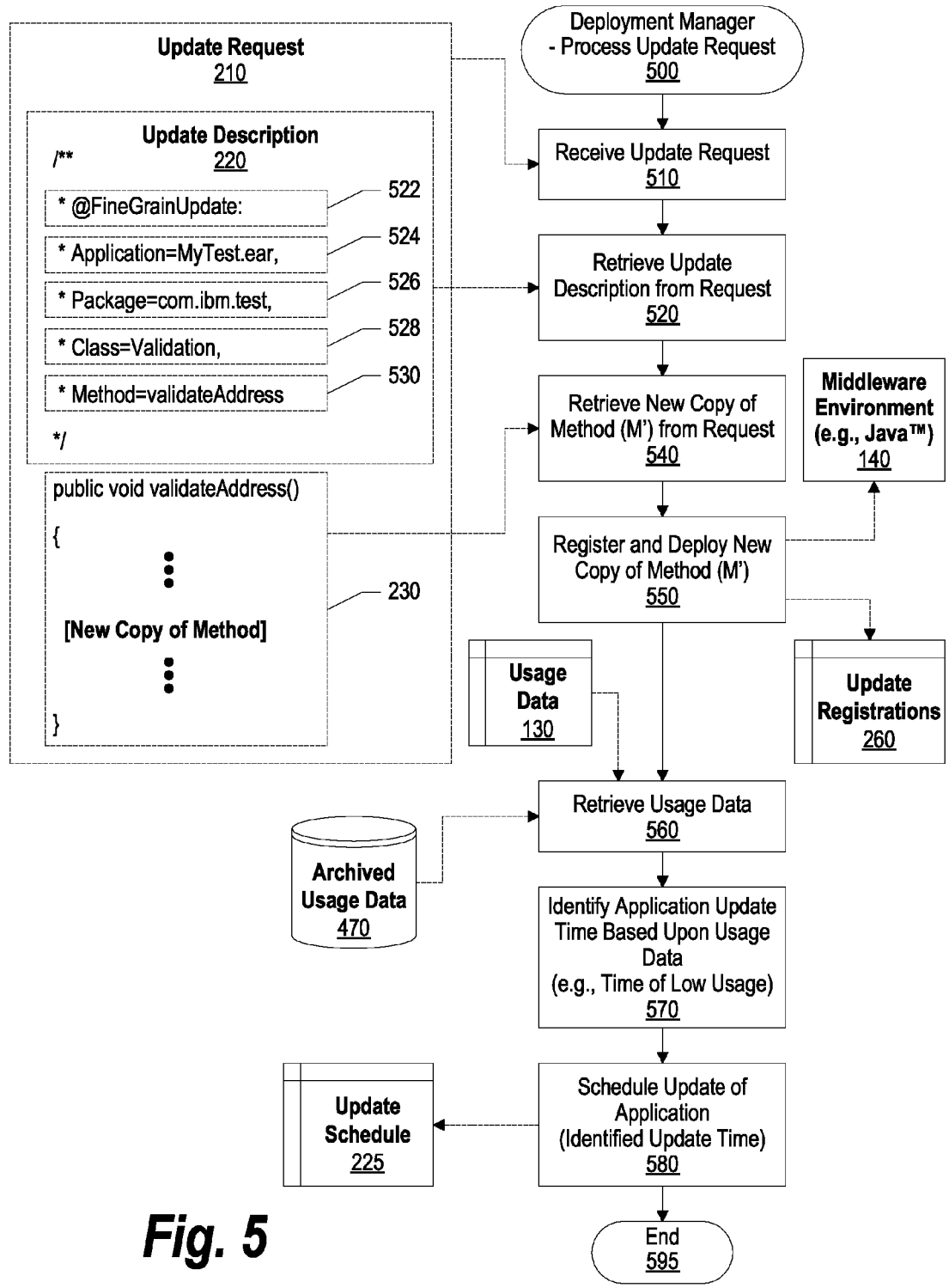
FIG. 5 is a flowchart showing an embodiment of steps taken by the deployment manager to process an update request.

FIG. 5 is a flowchart showing steps taken by the deployment manager to process an update request. The deployment manager's processing of an update request commences at 500 whereupon, at step 510, the deployment manager receives update request 210. When an application developer updates a method, the application developer creates update request 210 and sends it to the deployment manager.

Update request 210 includes update description 220 and new version of the method 230. Update description 220 describes the method being updated so the deployment manager can properly register the update and schedule the class file for updating. As shown, in one embodiment update description 220 includes tag 522 that informs the deployment manager that the request is to update a method ("@FineGrainUpdate"). Update description 220 also includes application identifier 524 that identifies the application that is being updated ("Application=MyTest.ear"). Package identifier 526 identifies the package that is being updated ("Package=com.ibm.test"). Class identifier 528 identifies the class that is being updated ("Class=Validation"), and method identifier 530 identifies the particular method that is being updated ("Method=validateAddress"). Update request 210 also includes new version of the method that is being updated (230). New version 230 includes the instructions that are executed. In a Java™ implementation, new version 230 may be encoded in bytecode that is adapted to be compiled by a Just-in-Time (JIT) compiler of a Java Virtual Machine (JVM) so it can be executed on a wide variety of platforms. As shown, in one embodiment, update description 220 is included as a comment block of the new version of the method (230). In this embodiment, the request is included in a single file.

At step 520, the deployment manager retrieves the description of the method being updated from update description 220, and at step 540, the deployment manager retrieves the new version of the method that is being updated. At step 550, the deployment manager registers the new version of the method that is being updated. Registering the new version of the method includes writing a registration entry to update registrations data store 260 as well as deploying the new version of the method in middleware environment 140.

At step 560, usage data pertaining to the method and/or the class file being updated is retrieved from usage data 130 as well as any archived usage data 470. At step 570, the deployment manager identifies a time to update the method. In one embodiment, the time to update the method is based on a time where usage of the method is low. For example, in an end-user application, a time of low usage may be found when the end users are not working (e.g., lunch break times, after hours, etc.). At step 580, the deployment manager schedules the method for updating using the identified time from step 570. The scheduled update time is written to update schedule 225. The deployment manager's processing of the update request thereafter ends at 595.

Figure 6:
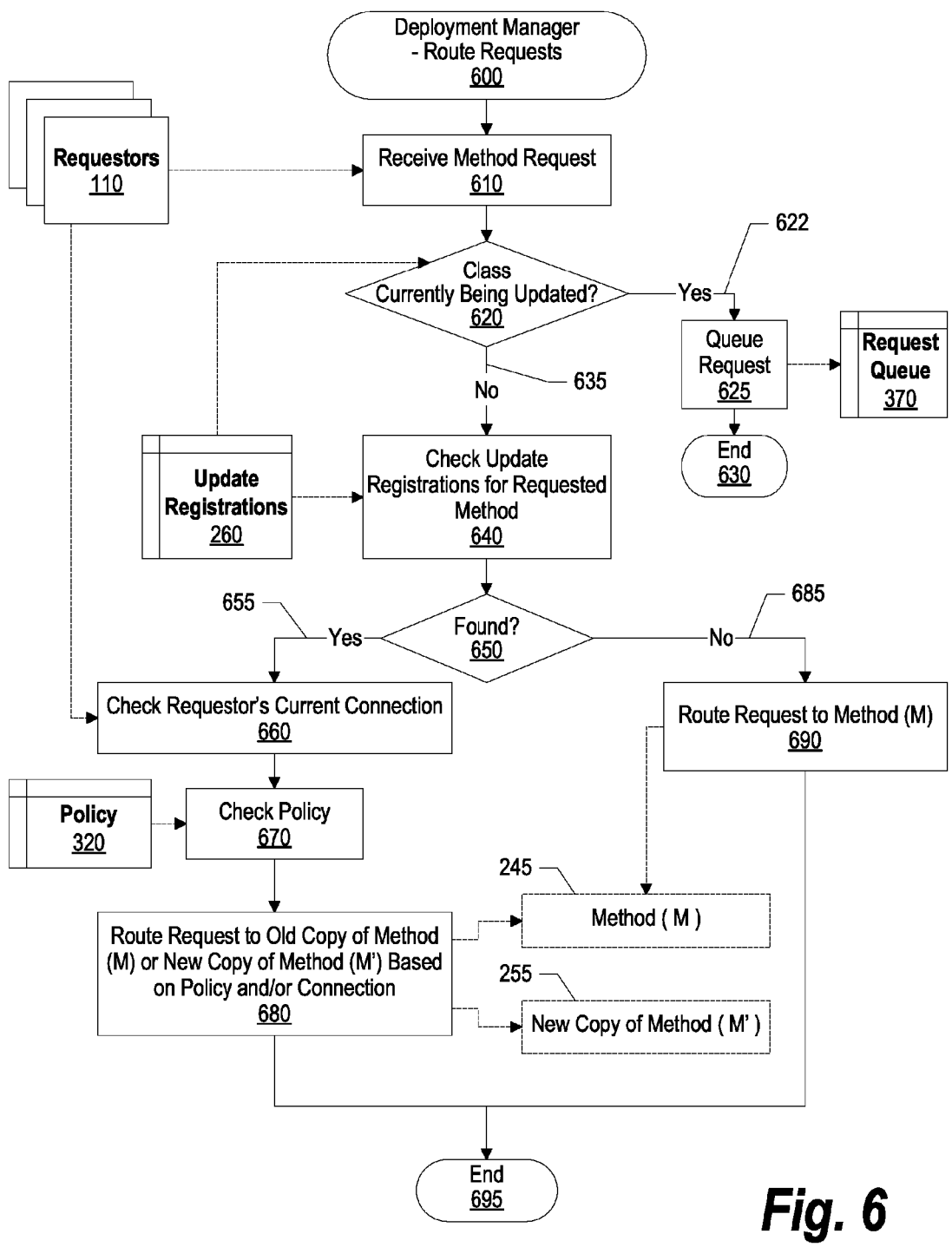
FIG. 6 is a flowchart showing an embodiment of steps taken by the deployment manager to process an update request.

FIG. 6 is a flowchart showing steps taken by the deployment manager to process an update request. Processing commences at 600 whereupon, at step 610, the deployment manager receives a method request from requestors 110. A determination is made as to whether the class to which the method belongs is currently being updated (decision 620). If the class is currently being updated, decision 620 branches to "yes" branch 622 whereupon, at step 625, the request is queued in request queue 370 and processing ends at 630. In one embodiment, request queue 370 is a FIFO queue.

If the class is not currently being updated, decision 620 branches to "no" branch 635 whereupon, at step 640, the deployment manager checks update registrations 260 to identify any updates that have been made to the method that is being requested (i.e., new version of the method that has been deployed but not yet updated in the appropriate class). A determination is made as to whether a deployed update is found for the method being requested by the requestor (decision 650). If an update is found, decision 650 branches to "yes" branch 655 whereupon, at step 660, the connection of requestor that is making the request is checked. Examples of connections include (1) a connection where requestor that is making a new request to the method, and (2) a connection where the requestor is currently executing the method prior to the received request. At step 670, a policy is checked by reading policy data store 320. policy 320 is used to determine whether the old version of the method (245) is executed or if the new version of the method (255) is executed. The policy works in conjunction with the requestor's current connection. For example, one policy routes new requests for new requestors (i.e., new connections) to the new version of the method, while routing old requestors (e.g., those requestors with current connections) to the old version of the method. Another policy routes requests to the new version of the method for all requestors (i.e., both new connections for new requestors as well as old requestors already having connections), and use the old version of the method only for those requestors currently executing the method. At step 680, the request is routed to the appropriate version of the method (either old version of the method 245 or new version of the method 255) based on the policy and/or the requestor's current connection. Processing of the request thereafter ends at 695.

Returning to decision 650, if a new version of the method that is being requested is not found in the update registrations, then decision 650 branches to "no" branch 685. The request is routed to the version of the method included in the class (method 245) file at step 690, and processing of the request thereafter ends at 695.

Figure 7:
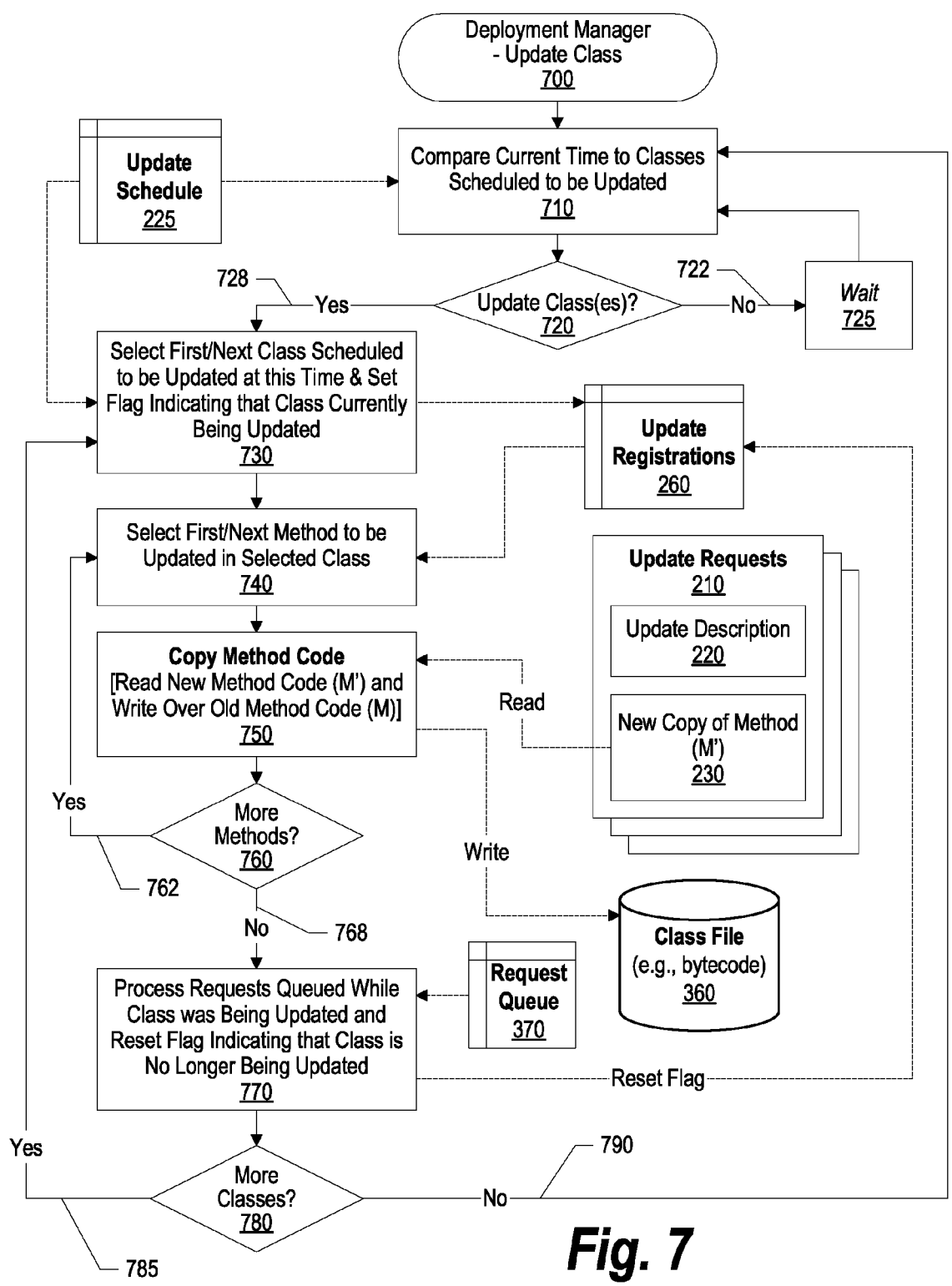
FIG. 7 is a flowchart showing an embodiment of steps taken by the deployment manager to route requests in order to handle method updates of the middleware application.

FIG. 7 is a flowchart showing steps taken by the deployment manager to route requests in order to handle method updates of the middleware application. Processing commences at 700 whereupon, at 710 the deployment manager compares the current date and time (collectively, the "time") to the classes scheduled to be updated as indicated in update schedule 225. Based on the comparison, a determination is made as to whether one or more classes are scheduled to be updated at the current time (decision 720). If no classes are scheduled to be updated at the current time, then decision 720 branches to "no" branch 722 whereupon, at step 725, processing waits for a period of time. The period of time can either be a fixed amount of time (e.g., one minute), or the period of time can be specified to wait until the next class is scheduled to be updated as indicated in update schedule 225. Processing then loops back to determine if it is time to update any classes. This looping continues until the update schedule indicates that it is time to update one or more classes, at which time decision 720 branches to "yes" branch 728.

When one or more classes are scheduled to be updated, at step 730, the first class from the list of one or more classes scheduled to be updated in update schedule 225 is selected. In addition, at step 730, a flag is set in update registrations data store 260 indicating that the class is currently being updated. While the class is being updated, requests for methods in the class are queued until the class update has completed. At step 740, the first method that is scheduled to be updated in the selected class is selected from update registrations data store 260. At step 750, the new version of the method is read from update request data store 210 (the request that provided the new version of the method) and the new version of the method is written to class file 360, overwriting the previous version of the method in the class file. A determination is made as to whether there are more methods scheduled to be updated in the selected class file (decision 760). If there are more methods to be updated, decision 760 branches to "yes" branch 762 which loops back to select the next method from the update registrations and copy the newly selected method code to the selected class file. This looping continues until all methods scheduled to be updated in the selected class file have been updated, at which point decision 760 branches to "no" branch 768.

At step 770, any requests that were queued while the class was being updated are read from request queue 370 and processed by the newly updated class that now includes the new version of one or more methods. In addition, during step 770 the flag that was previously set in step 730 is reset in order to indicate that the class is no longer being updated. Since the flag is no longer set, requests for methods in the updated class will no longer be queued and, instead, these requests will be processed by the methods included in the newly updated class.

A determination is made as to whether there are more classes scheduled to be updated at the current time (decision 780). If there are more classes scheduled to be updated at the current time, decision 780 branches to "yes" branch 785 which loops back to select and update the next class file scheduled for updating in update schedule 225. This looping continues until all classes that are scheduled to be updated at the current time have been updated, at which point decision 780 branches to "no" branch 790 which loops back to check the current time and wait for the next time that one or more classes are scheduled for updating.

Figure 8:
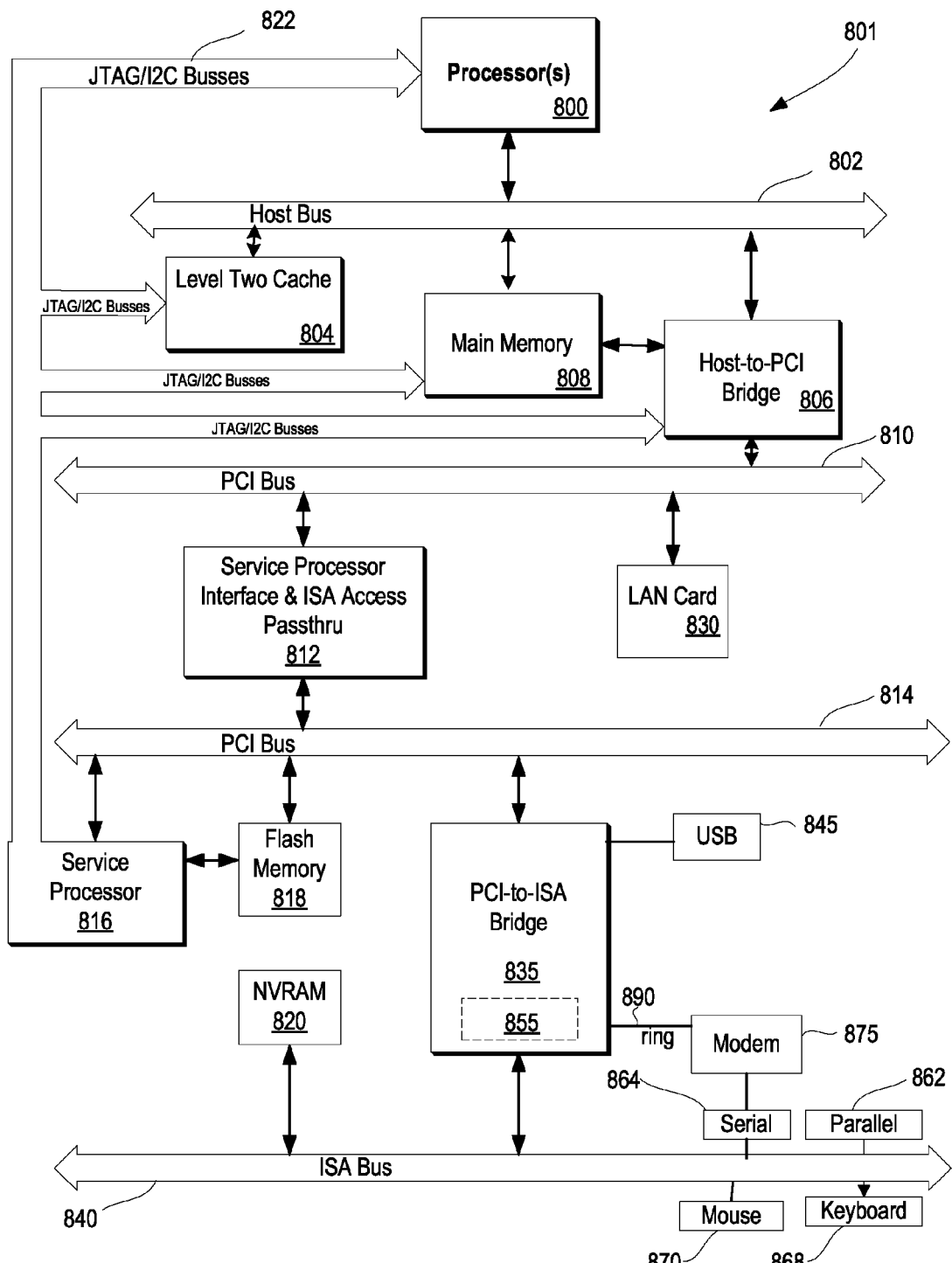
FIG. 8 is a block diagram of an embodiment of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for updating a software program, the method comprising:
 receiving an update request to update a method included in a middleware application, wherein the method is currently loaded in a middleware environment, and wherein the update request identifies a new version of the method and a class file that includes one or more methods including the method being updated;
 registering the new version of the method, the registering including writing the new version of the method to a heap that is managed by the middleware environment;
 scheduling an update of the class file for a future time;
 prior to the scheduled future time, receiving a plurality of requests for the method, wherein each of the requests is received from a corresponding requestor;
 identifying a routing policy;
 for each of the received requests:
  identifying a current connection between the method and the requestor that corresponds to the received request; and
 determining whether to route the received request to the method or to the new version of the method, wherein the determination of whether to route the received request to the method or to the new version of the method is based on the routing policy and the current connection;
 in response to the determining, routing one or more of the received requests for the method to the method;
 in further response to the determining, re-routing the requests not routed to the method to the new version of the method;
 executing the received requests in response to the routing and the re-routing; and
 updating the class file at the scheduled future time, wherein the updating further comprises:
  allocating a request queue;
  queuing requests received after the updating has commenced to the request queue;
  replacing the method with the new version of the method; and
  after the replacing, routing the queued requests to the new version of the method included in the class file.

2. The method of claim 1 further comprising:
 gathering usage data corresponding to the method;
 analyzing the usage data, the analysis resulting in a preferred time to update the method; and
 using the preferred time as the scheduled future time.

3. An information handling system comprising:
 one or more processors;
 a memory accessible by at least one of the processors;
 a nonvolatile storage area accessible by at least one of the processors;
 a middleware environment stored in the memory and executed by one or more of the processors;
 a heap stored in the memory and managed by middleware environment, the heap used to store class files, wherein the class files include one or more methods; and
 a set of instructions stored in the memory, wherein one or more of the processors executes the set of instructions in order to perform actions of:
  receiving an update request to update one of the methods stored in the heap, wherein the update request identifies a new version of the method and one of the class files that includes the method being updated;
  registering the new version of the method, the registering including writing the new version of the method to the heap;
  scheduling an update of the class file for a future time;
  prior to the scheduled future time, receiving a plurality of requests for the method, wherein each of the requests is received from a corresponding requestor;
  identifying a routing policy;
  for each of the received requests:

identifying a current connection between the method and the requestor that corresponds to the received request; and determining whether to route the received request to the method or to the new version of the method, wherein the determination of whether to route the received request to the method or to the new version of the method is based on the routing policy and the current connection;

in response to the determining, routing one or more of the received requests for the method to the method;

in further response to the determining, re-routing the requests not routed to the method to the new version of the method;

executing the received requests in response to the routing and the re-routing; and updating the class file at the scheduled future time, wherein the updating further comprises:

allocating a request queue;

queuing requests received after the updating has commenced to the request queue;

replacing the method with the new version of the method; and after the replacing, routing the queued requests to the new version of the method included in the class file.

4. The information handling system of claim 3 further comprising an additional set of instructions in order to perform actions of:

gathering usage data corresponding to the method;

analyzing the usage data, the analysis resulting in a preferred time to update the method; and using the preferred time as the scheduled future time.

5. A computer program product stored in a computer readable medium, comprising functional descriptive material that, when executed by a data processing system, causes the data processing system to perform actions that include:

receiving an update request to update a method included in a middleware application, wherein the method is currently loaded in a middleware environment, and wherein the update request identifies a new version of the method and a class file that includes one or more methods including the method being updated;

registering the new version of the method, the registering including writing the new version of the method to a heap that is managed by the middleware environment;

scheduling an update of the class file for a future time;

prior to the scheduled future time, receiving a plurality of requests for the method, wherein each of the requests is received from a corresponding requestor;

identifying a routing policy;

for each of the received requests:

identifying a current connection between the method and the requestor that corresponds to the received request; and determining whether to route the received request to the method or to the new version of the method, wherein the determination of whether to route the received request to the method or to the new version of the method is based on the routing policy and the current connection;

routing one or more of the received requests for the method to the method;

in further response to the determining, re-routing the requests not routed to the method to the new version of the method;

executing the received requests in response to the routing and the re-routing; and updating the class file at the scheduled future time, wherein the updating further comprises:

allocating a request queue;

queuing requests received after the updating has commenced to the request queue;

replacing the method with the new version of the method; and after the replacing, routing the queued requests to the new version of the method included in the class file.

6. The computer program product of claim 5 further comprising functional descriptive material that, when executed by a data processing system, causes the data processing system to perform actions that include:

gathering usage data corresponding to the method;

analyzing the usage data, the analysis resulting in a preferred time to update the method; and using the preferred time as the scheduled future time.

* * * * *